April 1, 1958     A. T. FUSCHI     2,828,972
SAFETY LOCK FOR TRACTOR-TRAILER COUPLINGS
Filed Oct. 13, 1955
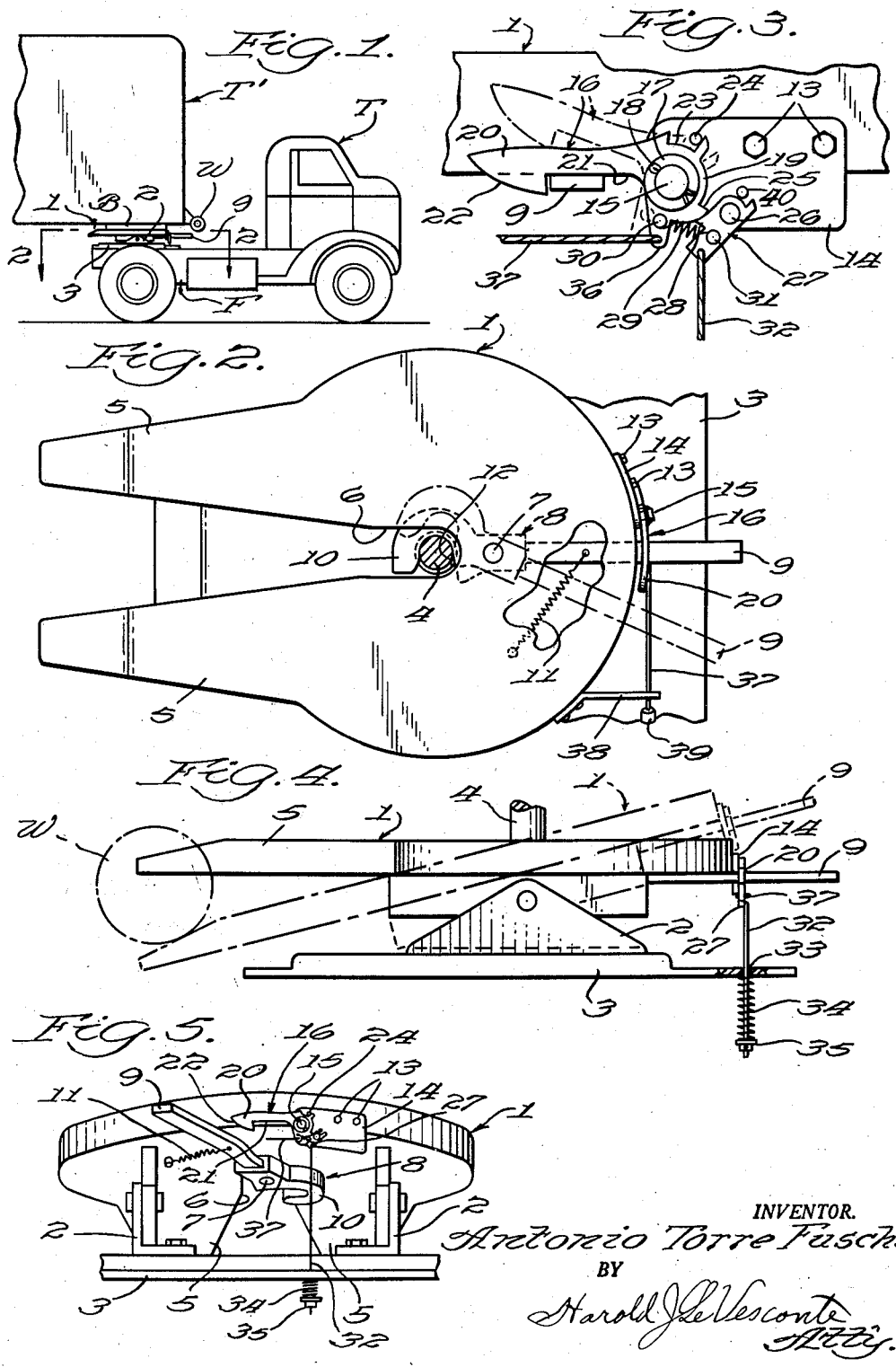
INVENTOR.
Antonio Torre Fuschi
BY
Harold J. LeVesconte
Atty.

United States Patent Office 2,828,972
Patented Apr. 1, 1958

2,828,972

SAFETY LOCK FOR TRACTOR-TRAILER COUPLINGS

Antonio Torre Fuschi, Los Angeles, Calif.

Application October 13, 1955, Serial No. 540,276

10 Claims. (Cl. 280—432)

This invention relates to devices for coupling tractors to trailers and more particularly to safety means in connection therewith.

The principal object of the invention is to provide a locking means for the coupling release handle of that type of coupling means in which the king pin of the coupling is on the trailer as distinguished from those types in which the king pin is on the tractor.

Another object of the invention is to provide a locking means for the coupling release handle of the above-mentioned type of coupling means in which a latch means securing the coupling release handle is manually moved to handle releasing position and is automatically moved to handle securing position as an incident to the separation of the tractor and trailer after disengagement of the king pin securing means with resultant assurance that upon being re-coupled to the same or another trailer the king pin securing means will be automatically locked against accidental or unintentional release.

With the foregoing objects in view, together with such additional objects and advantages as may subsequently appear, the invention resides in the parts, and in the construction, combination and arrangement of parts, described, by way of example, in the following specification of a presently preferred embodiment of the invention; reference being had to the accompanying drawings which form a part of said specification and in which drawings:

Fig. 1 is a side elevational view of a tractor and the forward portion of a trailer coupled thereto by means employing the present invention, Fig. 2 is an enlarged scale, plan view of the top surface of the fifth wheel component of the tractor and showing the king pin coupled thereto; the king pin being shown in section taken on the line 2—2 of Fig. 1, and a portion of the fifth wheel component being broken away to show details concealed thereby, Fig. 3 is a further enlarged, fragmentary, front elevational view of the portion of the fifth wheel to which the latch of the present invention is applied, Fig. 4 is a side elevation of the fifth wheel portion of a tractor showing the invention applied thereto, and Fig. 5 is a front elevation of the fifth wheel shown in Fig. 4 as it appears when tilted as indicated in dotted lines in Fig. 4.

Referring to the drawings, Fig. 1 shows a tractor T connected to a trailer T' by devices including a depending king pin on the bottom of the front end of the trailer which is detachably engaged by receiving and locking devices carried by the trailer; said devices including a fifth wheel element 1 mounted for tilting action on supporting bracket means 2 carried by a base plate 3 carried by the tractor frame F.

Referring next to Figs. 2 through 5, the fifth wheel element 1 comprises a metal plate having a smooth flat upper surface adapted to be engaged by the under face of the bolster plate B carried by the under side of the trailer and from which the king pin 4 depends. The fifth wheel element 1 at its forward end is of partially circular configuration as viewed in plan; said configuration terminating in rearwardly extending arm portions 5, 5 between which a king pin receiving slot 6 extends to the point of generation of the said partially circular configuration and the side walls of said slot adjacent to the point of termination being parallel and thence gradually diverging toward the ends of the arm portions 5, 5. Pivotally mounted at 7 on the under side of the fifth wheel element 1 is a locking lever 8 comprising a handle 9 extending beyond the forward end of the fifth wheel 1 at one side of the longitudinal line, and a hook like king pin engaging portion 10. A spring 11 extending between the fifth wheel and the handle 9 tends constantly to urge the locking lever 8 in a clockwise direction as viewed in Fig. 2 toward unlocking the king pin and the front face of the king pin hook portion is provided with a cam face 12 which upon being engaged by a king pin incident to backing the tractor under the trailer serves to force the lever into the locking position indicated in full lines in Fig. 2. All of the foregoing is standard construction with which the present invention is employed.

The present invention is concerned with a handle locking means which is operated automatically incident to the coupling and uncoupling operations to secure the king pin locking means against unintentional or accidental disengagement. In my prior application Serial No. 483,404, filed January 21, 1955, now Patent Number 2,736,573, this is accomplished upon the connecting of the tractor and trailer braking systems, but the present invention is directed to means which accomplishes the same desirable ends but which is not dependent on the presence of braking pressure for its action.

Fixed by suitable means such as bolts 13 to the front face of the fifth wheel element 1 is a bracket 14 disposed at one side of the path of movement of the handle 9 as it is moved between locking and unlocking positions; said bracket at the end edge thereof adjacent the handle 9 having a forwardly projecting stud 15 on which a latch element 16 is mounted for oscillation and is secured thereon by a washer 17 and cotter pin 18. The latch element 16 includes a hub portion 19 and a latch arm 20 disposed above the handle 9 when the handle is in king pin engaging position and including a handle engaging notch 21 and an upwardly and outwardly inclined cam face 22 beyond said notch. The hub portion 19 includes a notch 23 formed in the periphery having ends disposed to engage a stop pin 24 carried by the bracket 14 and effective to limit the extent of oscillation of the latch element on the stud 15.

The lower edge of the hub portion 19 also includes a stop shoulder 25 extending radially of the axis of the stud and positioned to oppose counter clockwise movement of the latch element. Mounted on a stud 26 adjacent the lower edge of the bracket 14 and adjacent to the hub of the latch member is a stop member 27 having a free end provided with a stop shoulder 28 engageable with the stop shoulder 25. A tension spring 29 extending between studs 30 and 31 carried respectively by the hub portion 19 and the stop member 27 constantly urges the stop member toward the periphery of the hub 19 and the latch member in counter clockwise movement. A cable 32 extends from the free end of the stop member 27 downwardly through a hole 33 in the base plate 3 and beneath the plate it carries a compression spring 34 and a stop collar 35. The lower edge of the hub 19 includes a depending arm 36 to which one end of a cable 37 is secured; the cable 37 extending laterally therefrom through a supporting bracket 38 and terminating in a knob 39 by which it may be grasped and pulled. Oscillation of the stop member in one direction is limited by engagement with the hub 19 and in the opposite direction by a stop pin 40 projecting from the bracket 14.

The operation of the invention is as follows: Assuming that the tractor is coupled to a trailer and is to be released, during the time it is coupled, the handle 9 is engaged in the notch 21. By pulling on the cable 37, the latch member 16 is rotated from the position shown in Fig. 3 clockwise until the stop shoulder 25 passes the stop shoulder 28 on the stop member and the spring 29 which has been stretched by the movement of the latch member will cause the stop member 27 to swing upwardly and lock the latch member against return movement. In this movement the notch 21 will clear the handle 9 so that the handle can be moved to release the king pin. During this time, the fifth wheel, being under the trailer will be in a horizontal plane, but as the tractor pulls away from the trailer, the caster wheels W at the front end of the trailer ride on the fifth wheel and as they pass the pivot point of the fifth wheel element, they cause it to tilt as shown in dotted lines Fig. 4. This tilting action takes up the slack on the cable 32 and compresses the spring 34 between the stop 35 and the under side of the base plate 3 and when the loading of the spring 34 is sufficient it causes the cable 32 to pull the end of the stop member downwardly out of engagement with the shoulder 25 of the latch member hub 19 and the spring 29 will then return the latch to handle engaging position as limited by the stop pin 24; the handle 9 being out of engagement therewith as shown in Fig. 5. When the tractor is again backed under a trailer the engagement of the king pin of that trailer with the cam face 12 will cause the handle to swing to the right as viewed in Fig. 5 forcing itself past the inclined face 22 and into the notch 21 and is thereby locked against accidental release.

By reason of the latching and latch releasing actions above described, the trailer is at all times securely locked to the tractor beyond any possibility of accidental or unintentional release. Further, this improved locking means is not dependent on the braking system of the vehicles and requires no change for use with vacuum or pressure braking systems.

While the foregoing specification discloses a presently preferred form of the invention, it is not to be inferred therefrom that the invention is limited to the exact form so disclosed, and it will be understood that the invention embraces all such changes and modifications in the parts and in the construction, combination and arrangement of parts as shall come within the purview of the appended claims.

I claim:

1. A safety locking means for tractor-trailer coupling devices of the type comprising a king pin depending from the under side of the trailer and complementary devices including a transversely tiltably mounted fifth wheel on the tractor provided with king pin engaging means including a manually operable king pin releasing handle projecting beyond the perimeter of the fifth wheel; said safety locking means comprising a handle engaging latch member mounted on the fifth wheel for movement into and out of the portion of the path traversed by the handle when the handle is in king pin engaging position, spring means constantly urging said latch member into said portion of said path, manually operable means for moving said latch member to a position out of said portion of said path, a spring biased releasable stop member effective to lock said latch member in said position out of said portion of said path, and means connecting said stop member with a portion of the tractor relative to which the adjacent portion of the fifth wheel is upwardly tiltable incident to either coupling or uncoupling operations and effective upon such tilting of the fifth wheel to move said stop member to latch member releasing position with resultant return of said latch member into said portion of said path.

2. A safety locking means as claimed in claim 1 in which a single spring provides the bias for said latch member and said stop member.

3. A safety locking means as claimed in claim 1 in which said latch member is disposed above said path and is provided with a handle receiving notch and with an inclined cam surface engaged by the handle as it moves to king pin locking position with momentary displacement of said latch member as the handle moves into position to be engaged by said notch.

4. A safety locking means for tractor-trailer coupling devices of the type comprising a king pin depending from the under side of the trailer and complementary devices including a transversely tiltably mounted fifth wheel on the tractor provided with king pin engaging means including a manually operable king pin releasing handle projecting beyond the perimeter of the fifth wheel; said safety locking means comprising a base member mounted on the front face of the fifth wheel, a latch member pivotally mounted on said base and extending laterally from said pivotal mounting above that portion of the path traversed by the handle which is occupied by the handle when engaging the king pin; said latch member having a notch in the lower edge thereof adapted to straddle the handle and prevent movement thereof in said path when the handle is in the king pin engaging position, spring means constantly yieldingly urging said latch member into handle engaging position, spring biased devices mounted on said base effective to lock said latch member out of handle engaging position, and other devices connected for actuation by tilting movement of the fifth wheel incident to an uncoupling or coupling operation to release said latch member locking devices with resultant return of said latch member to handle engaging position.

5. A safety lock means as claimed in claim 4 in which said locking devices and said latch member are biased by the same spring.

6. A safety lock means as claimed in claim 4 in which said devices for releasing said latch member locking devices includes a flexible member extending between said latch member locking devices and a portion of the fifth wheel mechanism relative to which the fifth wheel is tiltable.

7. A safety locking means for tractor-trailer coupling devices of the type comprising a king pin depending from the under side of the trailer and complementary devices including a transversely tiltably mounted fifth wheel on the tractor provided with king pin engaging means including a manually operable king ping releasing handle projecting beyond the perimeter of the fifth wheel; said safety locking means comprising a handle engaging latch member mounted on the fifth wheel for movement into and out of the portion of the path traversed by the handle when the handle is in king pin engaging position and effective to prevent movement of the handle out of king pin engaging position, means yieldingly holding said latch member in said position in said path, means effective to releasably lock said latch member out of said path to permit movement of the handle to king pin releasing position, and devices extending between the fifth wheel and a portion of the tractor relative to which the fifth wheel is tiltable and actuated by tilting of the fifth wheel incident to an uncoupling or a coupling operation to effect release of said latch member locking means with resultant return of said latch member into said portion of said path.

8. A safety means as claimed in claim 7 in which said latch member is provided with an inclined cam face positioned for engagement by the handle incident to the movement of the handle into king pin engaging position with resultant momentary displacement of said latch member and subsequent return to handle movement preventing position.

9. A safety means as claimed in claim 7 including manually operable means effective to move said latch member out of said path and into engagement with said lock means.

10. A safety means as claimed in claim 7 in which said means for yieldingly holding said latch member in handle movement preventing position additionally serves to provide spring bias for said latch member locking means.

References Cited in the file of this patent

UNITED STATES PATENTS

| | | |
|---|---|---|
| 1,941,682 | Gurton et al. | Jan. 2, 1934 |
| 2,142,748 | Fontaine | Jan. 3, 1939 |
| 2,372,976 | Norman et al. | Apr. 3, 1945 |
| 2,440,152 | Norman et al. | Apr. 20, 1948 |
| 2,623,753 | Madigan | Dec. 30, 1952 |